United States Patent [19]

Makino et al.

[11] Patent Number: 5,211,787

[45] Date of Patent: May 18, 1993

[54] METHOD FOR IMPROVING THE AGING RESISTANCE OF THE SIDEWALLS OF RETREADED TIRES

[75] Inventors: Yoshihiro Makino; Larry B. Elkins, both of Murfreesboro, Tenn.

[73] Assignee: Bridgestone/Firestone, Inc., Akron, Ohio

[21] Appl. No.: 707,492

[22] Filed: May 30, 1991

[51] Int. Cl.$^5$ .............................................. B29D 30/54
[52] U.S. Cl. ...................................... 156/96; 152/524; 156/95; 427/140; 427/393.5
[58] Field of Search .......................... 156/95, 96, 116; 152/524, 525; 427/140, 388.4, 393.5, 384; 252/384, 401, 403

[56] References Cited

U.S. PATENT DOCUMENTS

| | | | |
|---|---|---|---|
| 2,200,756 | 5/1940 | Messer et al. | 252/401 X |
| 2,266,576 | 12/1941 | Tuley et al. | 252/401 X |
| 3,591,410 | 7/1971 | Ross | 427/140 |
| 4,521,460 | 6/1985 | Dabi et al. | 427/393.5 |
| 4,967,819 | 11/1990 | Kansupada | 152/524 |

*Primary Examiner*—Geoffrey L. Knable
*Attorney, Agent, or Firm*—Frank J. Troy, Sr.

[57] ABSTRACT

A method for improving the aging resistance of the sidewalls of retreaded tires is provided. The method involves the steps of treating the surface of the sidewalls of the worn tire to be retreaded with an aqueous solution or dispersion containing a film-forming polymer and an antiozonant, retreading the treated tire and then curing the treated retreaded tire thereby causing the antioxidant to migrate into the inner portion of the sidewall.

The method of the invention is particularly useful for improving the aging resistance of the sidewalls of worn truck and bus tires which are conventionally retreaded several times.

7 Claims, No Drawings

METHOD FOR IMPROVING THE AGING RESISTANCE OF THE SIDEWALLS OF RETREADED TIRES

BACKGROUND OF THE INVENTION

The invention relates to an improvement in the aging resistance of the sidewalls of retreaded tires. More particularly, the invention relates to a method for improving the aging resistance of the sidewalls of the retreaded tire during the retreading process.

One of the long term problems encountered by the retread tire industry has been a shortage of worn tire casings which are suitable for retreading. A significant aspect of this problem has been that the sidewalls of the worn tire generally have lower aging resistance than the sidewalls of the original tire. This often results in the sidewalls of the retreaded tire developing ozone cracking during the service life of the retreaded tire thereby making the worn tire casing unsuitable for further retreading. The problem is particularly serious in the case of truck and bus tires where the economics of truck and bus vehicle operations which includes the high cost of new tires dictate that the original tires be capable of being retreaded more than once, preferably 3 to 4 times or more.

A method of treating the surface of vulcanized rubber products which is reported to result in reduced friction coefficients and improved ozone resistance is described in Japanese patent 60108438. The method as set forth in the patent comprises treating the surface of vulcanized rubber products such as natural rubber, butyl rubber, SBR etc. with an aqueous solution of an organic active halogen compound containing—CONX—groups, wherein X is halogen, such as for example an N-haloisocyanuric acid. The treating method described in the reference involves soaking the vulcanized rubber product in the treating solution for 15–60 minutes at room temperature.

SUMMARY OF THE INVENTION

In accordance with the present invention, a method for improving the aging resistance of the sidewalls of retreaded tires comprises the steps of:
(a) treating the surface of the sidewalls of a worn tire to be retreaded with an aqueous solution or dispersion containing a film-forming polymer and an antiozonant
(b) retreading said treated tire; and
(c) curing the treated retreaded tire in such a manner as to apply heat to the treated sidewalls thereby causing the antiozonant to migrate into the inner portion of the sidewall.

DETAILED DESCRIPTION OF THE INVENTION

As indicated, the first step in the method of the invention involves treating the surface of the sidewalls of the worn tire to be retreaded with an aqueous solution or dispersion of a film forming polymer and an antiozonant.

It should be noted that it is generally preferred to prepare the worn tire for retreading prior to treating the sidewalls. Thus, the worn tire should be buffed to remove the remaining original tread and the sidewalls cleaned before performing the sidewall treatment. This serves to maintain the cleanliness of the sidewall surface and thereby results in the production of a smoother polymer film thereon.

Film-forming polymers which may be employed include virtually any of those which are soluble in water or which can be dispersed therein to form a stable polymer latex. Suitable film-forming polymers which may be employed include polyvinyl alcohol, NR and SBR. Acrylic polymers may also be suitable. A preferred film-forming polymer is polyvinyl alcohol. It should be noted that aqueous solutions or latcies of such polymers are commercially available and it is often preferred to employ the aqueous polymer solutions or latices for ease of handling.

Antiozonants which may be employed are the well known para-phenylenediamine; N,N'-di-3(5-methylheptyl)-p-phenylenediamine; N-(1,3-dimethylbutyl)-N'-phenyl-p-phenylenediamine; N,N'-bis(1,4-dimethylpentyl)-p-phenylenediamine and the like. The preferred The aqueous solution or dispersion containing the film-forming polymer and antiozonant can be prepared by simply mixing the antiozonant with the aqueous polymer solution or polymer latex. Amounts of antiozonant added to the aqueous polymer solution or polymer latex can range from about 0.5 to about 6 parts of antiozonant for each 10 parts of aqueous polymer solution or polymer latex with the preferred amount being 3 parts of antiozonant per 10 parts of polymer solution or latex.

The aqueous polymer solution or polymer latex containing the antiozonant can be applied to the surface of the tire sidewalls by any convenient method such as spraying or by painting with a brush. The treated sidewalls are then allowed to dry at ambient temperature before proceeding with the retreading process.

The next step in the method of the invention is the retreading of the treated tire. This can be accomplished by any conventional retreading method as long as the method permits the application of heat to the sidewall areas of the tire during curing of the retread. However, the method of the present invention is particularly applicable to the method of retreading commonly referred to as "precure retreading" or Bandag retreading. This method of retreading involves using a tread that is cured with its tread design prior to applying it to the buffed tire casing. The precured tread is generally produced in rolls by a supplier in the ranges of sizes and designs required by the retreader. The retreader applies the precured tread to the buffed tire casing using a thin layer of uncured rubber to bond the precured tread to the buffed casing. Curing of the retreaded tire is conducted with the tire inflated and undistorted and with a flexible envelope or air bag within a chamber or autoclave in which enough pressure exists to force the tread into contact with the casing and at a temperature sufficient to cure the bonding layer (i.e. 60°–100° C.) and with the interior of the bag or envelope vented to the atmosphere.

The final step of the method of the invention involves curing the treated retreaded tire in such a manner that heat is applied to the treated sidewalls of the tire thereby causing the antiozonant present in the polymer film formed thereon to migrate into the inner portion of the sidewall. The preferred method of curing the retreaded tire in accordance with the present invention is that utilized in the Bandag method of retreading described above. Thus, the curing is effected in a chamber or autoclave using an air bag or envelope at cure temperatures ranging from 60°–100° C.

The method of the invention can be utilized to treat the sidewalls of a tire each time it is returned for retreading thereby maintaining the aging resistance of the sidewalls and permitting the original tire to be retreaded 3 or 4 times or more.

The following experiments are submitted for the purpose of further illustrating the nature of the present invention and are not intended as a limitation on the scope thereof.

Experimental Evaluations

In these experiments, treating solutions were prepared by mixing aqueous solutions of polyvinyl alcohol with varying quantities of antiozonant with the mixing being conducted at 60° C. The aqueous solution of polyvinyl alcohol employed was an approximately 17% solution of polyvinyl alcohol in water having a viscosity of 2600±500 centipoises (#3 spindle@30RPM) (referred to hereinafter for convenience as "PVA"). The antiozonant employed was N-(1,3-dimethylbutyl)-N'-phenyl-p-phenylenediamine (referred to hereinafter for convenience as "6C").

Treating solution #1 was prepared by mixing 10 parts by weight of PVA with 1.5 parts by weight of 6C. Treating solution #2 was prepared by mixing 10 parts by weight of PVA with 3.0 parts by weight of 6C. For comparative purposes, treating solution #3 was prepared by mixing 6C antiozonant with ethanol at a 1:1 weight ratio in order to determine the effect of coating the sidewall with antiozonant alone.

A worn out 285/75R24.5 size truck-bus tire was utilized to conduct the tests. The tire was first buffed for retreading using a conventional buffing technique. After buffing was completed, the sidewall of the tire was cleaned to remove excess buffing dust. Sections of the sidewall were then painted with the various treating solutions and permitted to air dry for about 10 minutes. A section of the sidewall was left untreated to serve as a control.

The tire was then retreaded using the precured tread on Bandag method of retreading. The tire was then cured with the tire inflated using a flexible envelope inflated with heated air (100° C.) in a chamber at 100° C. for 3 hours and 45 minutes. After curing was completed, small samples (1 gram) of each tire section were analyzed by Gas Chromatography to determine the relative amounts of antiozonant in the sidewall. This analysis was conducted for the purpose of determining if the process caused the antiozonant to migrate into the inner portion of the sidewall.

The effect of the method of the invention on the ozone resistance of the sidewall of the retreaded tire was determined using the following procedure. Test strips 1" wide×6" long×3 millimeters thick were cut from each sidewall section. The test strips were then tested for dynamic ozone resistance by placing the strips in an ozone chamber operating at 33° C. at an ozone concentration of 30 parts per hundred million with the test strips being subjected to a stress of ±15% and a flex rate of 30 cycles/min. The ozone test was conducted for a period of 150 hours. After the ozone exposure was completed, the test strips were visually rated for ozone crackig using a rating system which employs a rating scale of 1-5 with the ratings having the following meanings: 1=very slight, 2=slight, 3=moderate, 4=severe, and 5=very severe.

The sidewall samples, types and amounts of treating solutions, relative amounts of antiozonant and dynamic ozone test results are shown in Table I.

TABLE I

| Sidewall Sample | Treating Solution | | | Amount 6C[1] Relative Value | Dynamic ozone Rating 150 hours |
|---|---|---|---|---|---|
| | No. | Type | Amounts (wt.) | | |
| Control | None | None | None | 1.04 | 5-strip broke |
| 1 | 1 | PVA/6C | 10/1.5 | 3.62 | 3 |
| 2 | 2 | PVA/6C | 10/3 | 6.12 | 2 |
| 3 | 3 | Ethanol/6C | 1/1 | N.D.[2] | N.D. |

[1]Determined by Gas Chromatography analysis.
[2]N.D. = not determined - coating too weak to remain on sidewall.
Note: For comparative purposes, a sample of new tire sidewall subjected to the same ozone test had a rating of 3. Thus, the method of the invention appears to provide the worn sidewall with ozone resistance equivalent to or even better than a new tire sidewall.

An additional tire containing an untreated sidewall section, a section of sidewall treated with treating solution #1 and a solution of sidewall treated with treating solution #2 was also prepared and retreaded substantially in accordance with the above procedure except that the tire was subjected to an ozone drum test. This test was conducted utilizing the following conditions: tire pressure=7.7 kilograms per square centimeter, load=2800 kilograms, speed=60 kilometers per hour, ozone concentration=30 parts per hundred million and temperature=about 30° C. The tire was run for a total of 21,390 kilometers and the sidewall sections rated for ozone cracking using the same rating system described above. Test results are shown in Table II.

TABLE II

| Sidewall Sample | Treating Solution | | | Ozone Drum Test Rating |
|---|---|---|---|---|
| | No. | Type | Amounts (wt.) | |
| Control | None | None | None | 4 |
| 1 | 1 | PVA/6C | 10/1.5 | 2 |
| 2 | 2 | PVA/6C | 10/3 | 1 |

We claim:

1. A method for improving the aging resistance of the sidewalls of retreaded tires comprising the steps of:
   (a) treating the surface of the sidewalls of a worn tire to be retreaded with an aqueous solution or dispersion containing a film-forming polymer and an antiozonant; said treated tire; and
   (b) retreading
   (c) curing the treated tire in such a manner as to apply heat to the treated sidewalls thereby causing the antiozonant to migrate into the inner portion of the sidewall.

2. The method of claim 1 wherein the film forming polymer of said aqueous solution is polyvinyl alcohol.

3. The method of claim 1 wherein said antiozonant is a paraphenylenediamine derivative.

4. The method of claim 1 wherein said antiozonant is N-(1,3-dimethylbutyl)-N'-phenyl-p-phenylenediamine.

5. The method of claim 1 wherein the amounts of antiozonant included in said aqueous solution or dispersion range from 0.5 to 6 parts by weight of antiozonant per 10 parts by weight of aqueous solution or dispersion.

6. The method of claim 1 wherein retreading step (b) is performed using a precured tread.

7. The method of claim 1 wherein said curing step (c) is performed in a curing chamber with the tire inflated using a flexible envelope inflated with air at a temperature of 100° C. thereby applying heat to the sidewalls.

* * * * *

UNITED STATES PATENT AND TRADEMARK OFFICE
CERTIFICATE OF CORRECTION

PATENT NO. : 5,211,787

DATED : May 18, 1993

INVENTOR(S) : Yoshihiro Makino and Larry B. Elkins

It is certified that error appears in the above-identified patent and that said Letters Patent is hereby corrected as shown below:

Column 4, line 46, "said treated tire; and" should be deleted

Column 4, line 47, "retreading" should read --retreading said treated
    tire; and--

Signed and Sealed this

Fifth Day of April, 1994

Attest:

BRUCE LEHMAN

Attesting Officer

Commissioner of Patents and Trademarks